United States Patent [19]
Boggs et al.

[11] 3,831,240
[45] Aug. 27, 1974

[54] METHOD OF INSTALLING VENTED PLUGS IN PIN BORES

[75] Inventors: Roger L. Boggs; David John Balzer, both of East Peoria; Glenn Melvin Haslett, Peoria, all of Ill.

[73] Assignee: Caterpillar Tractor Co., Peoria, Ill.

[22] Filed: Apr. 6, 1973

[21] Appl. No.: 348,340

Related U.S. Application Data
[62] Division of Ser. No. 130,664, April 2, 1971, Pat. No. 3,762,778.

[52] U.S. Cl............... 29/148.3, 29/401, 29/407, 29/450, 53/43, 29/149.5 R
[51] Int. Cl............... B21h 7/00, B21k 19/00
[58] Field of Search ......... 29/401, 148.3, 405, 407, 29/450, 149.5 R; 53/43 X, 37, 320; 138/89; 220/DIG. 19, 24.5; 305/14

[56] References Cited
UNITED STATES PATENTS

| | | | |
|---|---|---|---|
| 1,254,975 | 1/1918 | Brown | 138/89 UX |
| 2,304,521 | 12/1942 | Wuestman | 53/43 X |
| 2,410,190 | 10/1946 | Townhill | 53/43 X |
| 2,929,182 | 3/1960 | Silverstein | 53/43 X |
| 3,034,207 | 5/1962 | Spase | 29/405 |
| 3,362,129 | 1/1968 | Scherer et al. | 53/43 |
| 3,451,727 | 6/1969 | Deli et al. | 29/148.3 X |
| 3,492,054 | 1/1970 | Boggs et al. | 305/14 X |
| 3,737,973 | 6/1973 | Stawski | 53/43 X |

*Primary Examiner*—Charlie T. Moon
*Attorney, Agent, or Firm*—Phillips, Moore, Weissenberger, Lempio & Strabala

[57] ABSTRACT

An improved method and apparatus are provided for sealing hollow pins which are commonly used as lubricant reservoirs in, e.g., track chain assemblies of crawler tractors, and linkage joints of earthmoving vehicles. One embodiment of the invention comprises a plug of elastomer material which has a lubricant passage axially therethrough, which passage receives an auxiliary plug means for the purpose of obturating the passage as well as causing radial expansion of the elastomer plug into positive engagement with a receiving axial bore in a hollow pin. The auxiliary expansion means takes the form of a screw, a spherical ball, or a headless plug employing a plurality of annular serrations. Another embodiment comprises a spherical ball which is received in a stepped, axial bore of a hollow pin and is retained therein by a Belleville washer. The invention facilitates refilling in the field of the lubricant reservoir contained within the pin.

2 Claims, 8 Drawing Figures

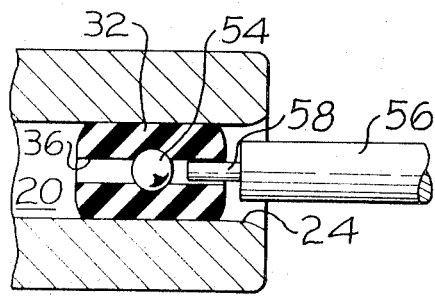
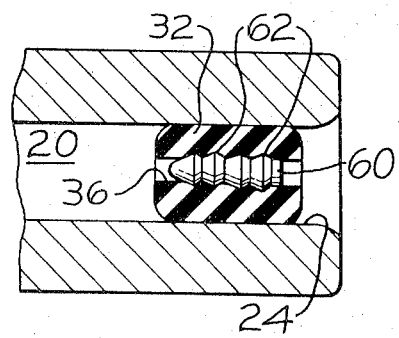
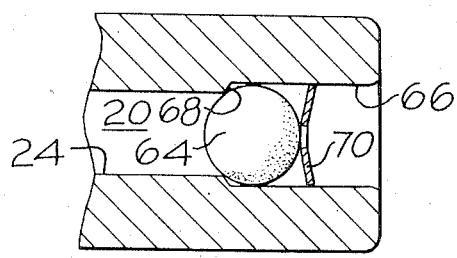
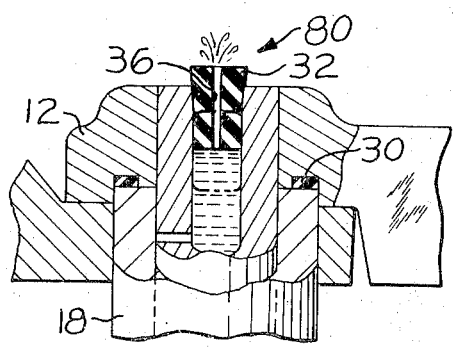
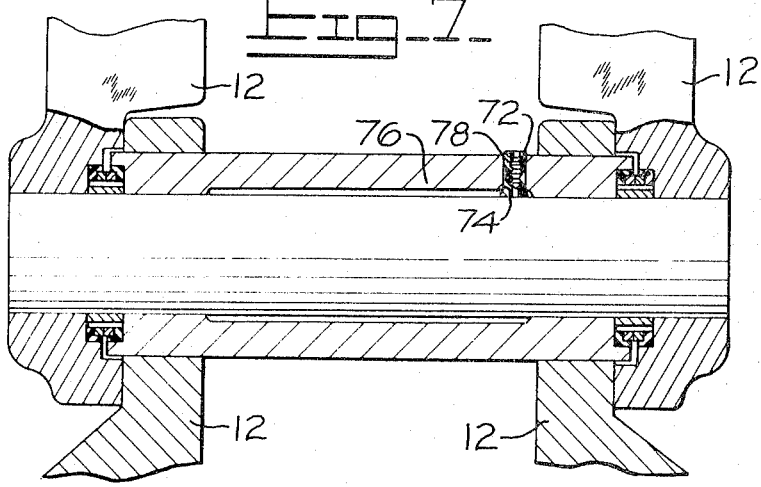

METHOD OF INSTALLING VENTED PLUGS IN PIN BORES

This is a division, of U.S. Pat. No. 130,664, Filed Apr. 2, 1971, now U.S. Pat. No. 3,762,778.

BACKGROUND OF THE INVENTION

It is generally known that earthmoving equipment is subject to some of the most severe operating environments demanded of any machines in everyday use. In particular, the track chain assemblies of crawler tractors operate in intimate contact with an abrasive soil environment. The pin and busing hinge joints which are used to articulately couple pairs of spaced links that carry ground-engaging track shoes are subject to extreme wear from abrasive material and very high stresses caused by engagement with drive sprockets.

Attempts have been made to increase service life of such track assemblies by improved metallurgy, factory sealing and lubricating the joints, and providing such factory-assembled joints in readily-serviced, plug-in cartridge form. Two forms of such sealed and lubricated hinge joints, disclosed in U.S. Pat. No. 3,463,560, and 3,492,054, have proved effective in obtaining increased component life; however, production costs, which must be held to a minimum to assure customer acceptance through maximum product value, have proved to be a problem.

One problem related to cost reduction is effective and economical sealing of the pin bores used for storing lubricant so vital for improved internal wear of the joints. High manufacturing and service costs resulting from precision machining and machine downtime have precluded use of threaded and pressed-in steel plugs in the vast quantities of such lubricated hinge pins used by present-day industry. Material cost, time and trouble of removing worn and corroded plugs for track service would be prohibitive and impractical. Alternate plugs, easier to install and service, and made of more economical elastomer material, are applicable because they eliminate the basic problems of metallic plugs which occur due to distortion from heat treatment, permanent seizure of such plugs, and even minute scratches on the plugs, etc., that could result in the loss of lubricant.

However, even though elastomer plugs can be lubricated to facilitate assembly and will subsequently swell by absorbing contacting oil, they remain susceptible to elevated internal pressures in the lubricant reservoir which could result in the plugs inadvertant expulsion. Because of the plug's uncertain frictional retaining characteristics, supplemental means must be provided to assure its positive retention under all conditions.

SUMMARY AND OBJECTS OF THE INVENTION

In accordance with the present invention, a simple and advantageous means has been found to expedite assembly and service of lubricated hinge joints by effectively employing a low-cost elastomer plug for containing lubricant in a reservoir-type hinge pin.

A further advantage is the supplemental means of increasing the frictional holding capability of the plug which also makes possible expedient replenishing of pin lubricant without physical removal of the plug.

It is therefore the object of the present invention to provide economical and effective means of plugging reservoir pins employed in sealed and lubricated hinge joints.

An additional object is to afford effective venting means for the reservoir regardless of how supplemental fluid is added.

Another object is the provision of auxiliary plug that serves both as a vent closure and expansion means that is capable of increasing unit loading of the plug's peripheral surface to obtain a maximum holding force whether it be used for a bore disposed axially in a pin or radially in the wall of a tubular bushing.

Still another object is the ready accessibility and facility to remove said expansion means for expedient replenishing of the lubricant supply.

Still another object is the provision of an enhanced spherical plug which is removably retained in its operative environmnet by Belleville retaining means.

BRIEF DESCRIPTION OF THE DRAWINGS

FIG. 4 disclosed enother spherical-type auxiliary expansion plug;

FIG. 5 is a similar elastomer plug with a headless auxiliary expansion plug;

FIG. 6 is an alternate embodiment of the elastomer plug in spherical form with modified retaining means;

FIG. 7 is a plan view in section of a similar hinge joint wherein the bushing rather than the pin has an internal lubricant reservoir;

FIG. 8 illustrates the method by which such hinge joints of wrapped and stored track would be filled with lubricating oil.

DESCRIPTION OF THE PREFERRED EMBODIMENT

Figure 1:
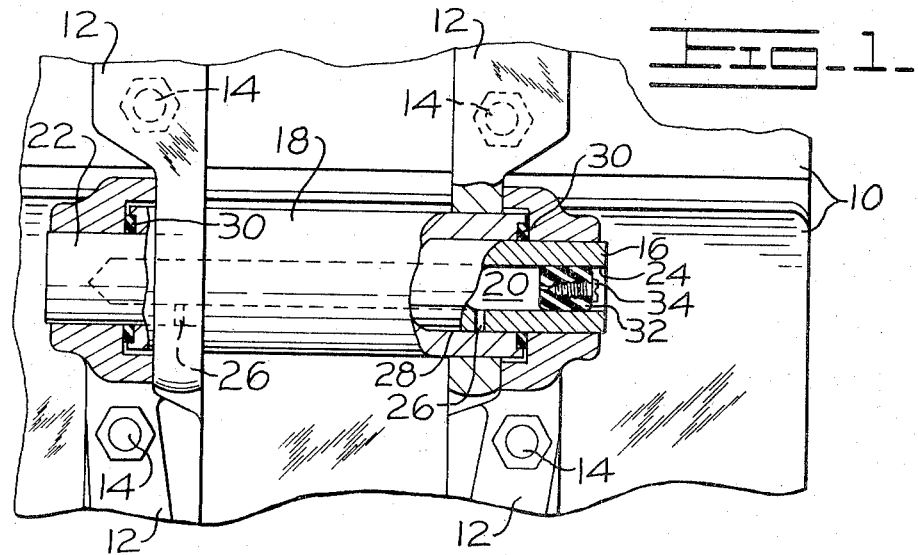
FIG. 1 is a plan view in partial cross section of a hinge joint and a portion of a track chain.

Referring to the drawings, the track assembly illustrated in FIG. 1 comprises a plurality of ground-engaging track shoes 10 each of which are rigidly secured to a pair of spaced, parallel, interconnected track links 12 as by a plurality of bolts 14. Each pair of track links 12 is pivotally connected by means of a hollow track pin 16 and a complementing coaxially disposed bushing 18 to an adjacent and cooperating pair of links in such a manner that an articulated track chain is formed. With all track sections coupled by such pin and bushing hinge joints an endless track chain is formed which is trained over a drive sprocket and an idler sprocket disposed on opposite sides of a tractor (not shown) to afford motivating and steering means for an effective, crawler-type vehicle. Tracks of the present type are typically provided two-piece master track links (not shown) to facilitate assembly and service procedures.

Pin 16 conveniently contains a central cavity 20 that is defined by closed end 22 and open end 24 which makes possible a reservoir to contain a supply of lubricant. The lubricating fluid distributed through radial bores 26 to the highly-loaded, coacting, internally disposed surfaces 28 of the pin and bushing contributes substantially to extending the service life of these members. Suitable seals 30 are normally provided in the vicinity of the bushing ends to minimize loss of the viscous lubricating fluid and to prevent entry of foreign matter into the joints. As previously noted, suitable plug means such as disclosed at 32 are necessarily provided to close the open end of hollow track pin 16 in order to retain the supply of lubricant stored within the reservoir in the track pin.

High-volume production and intricate assembly procedures of current earthmoving tractors make use of threaded and/or tapered metallic plugs unfeasible because of the expense involved in their manufacture. Plugs made of elastomer material which comprise this invention are a feasible alternative to metallic plugs. However, to employ such plugs successfully, supplemental venting and retaining means in the form of an auxiliary plug means 34 is provided to obtain increased unit pressure from the resilient plug 32. Increasing the outward radial force by internally positioned auxiliary plug means assures positive retention of the resilient plug under all environmental conditions including that of increased internal pressure that might occur in the reservoir during operations.

If excessive air or not air at all is provided in the reservoir, some fluid compartments can become highly pressurized during operations and consequently starve critical components of vital lubricant. On other occasions, pressure can expel the sensitive plug seals, allowing discharge of all oil from the reservoir. Air lock can also give faulty initial readings resulting in insufficient lubricant to allow the component to realize its anticipated service life.

Figure 3:
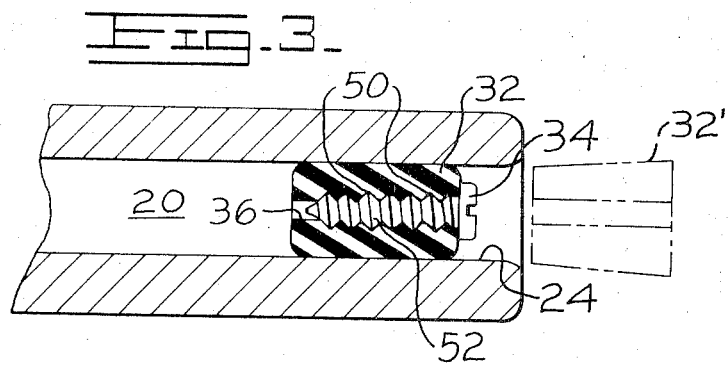
FIG. 3 is an enlarged cross-sectional view of a reservoir-type pin with a vent-type elastomer plug and assembled complementing auxiliary expansion plug.

As best shown in FIG. 3, elastomer plug 32 is preferably afforded at least one small-diameter, full-length axial passage 36 which can be conveniently sealed by the screw-type auxiliary plug 34 after reservoir 20 has been filled. Passage 36 conventionally facilitates initial filling of the lube reservoir 20 by readily receiving a thin hollow needle whereupon hypodermic injection of the lubricant is accomplished while air is vented out around the needle.

Figure 2:
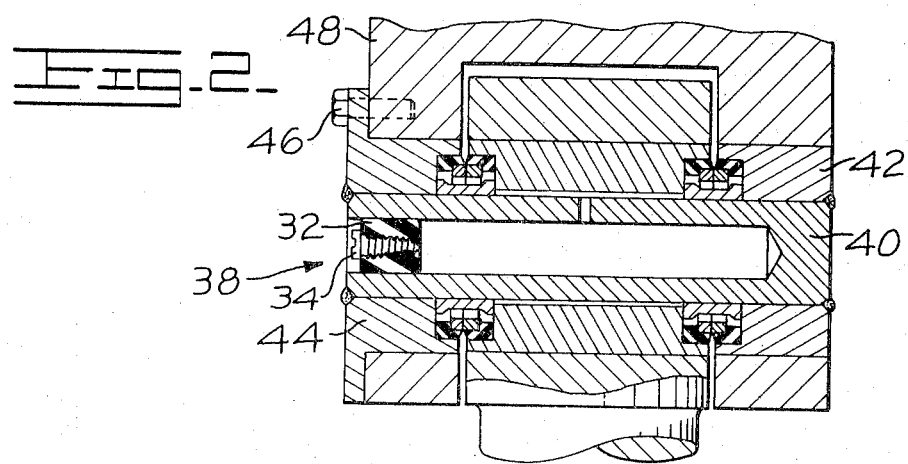
FIG. 2 shows a sectional view of a cartridge-type hinge joint.

FIG. 2 discloses another type of sealed and lubricated joint in the form of a cartridge hinge joint 38 that has a hollow pin 40 with one integrally attached head 42 and a flanged, retainer cap 44 which is detachably secured by a screw 46 to a link member 48. This type of joint is typically employed in the bucket support linkage of end loaders, and can incorporate at one end of the pin a similar resilient plug means 32 having an auxiliary plug 34 to facilitate servicing of the joint.

Turning now to FIG. 3, there is shown in enlarged scale, how plug 32' may be inserted into open end 24 as shown at 32. The auxiliary passage 36 can then receive supplemental fluid lubricant and be subsequently sealed by a relatively coarse-threaded screw or auxiliary plug means 34. These threaded members may be formed of any suitable material including plastic; however, it is desirable that the edges 50 of the threads 52 be rounded because sharp edges can detrimentally affect the plug by a drilling or reaming action if the screw should be rotated excessively. Additionally, it is preferable that the root diameters of the screws be a minimum of 1/32 of an inch larger than the vent passage in its swelled or compressed state. If a soft grade of rubber or elastomer is used for the resilient plug, a larger differential in diameters would be desirable.

FIG. 4 disclosed still another auxiliary expansion plug 54 of a spherical shape that can be readily installed in the elastomer plug passage 36 by any suitable impact tool that could be magnetized to facilitate aligning and assembly of the minute ball plugs. Such a tool is as shown at 56 having a stepped end portion 58. To refill reservoir 20, auxiliary ball plug 54 can be displaced by tool 56 such that it is expelled from passage 36 into reservoir 20. The auxiliary ball plug 54 may be made of plastic or metal and would be inexpensive enough to be considered disposable. After the reservoir is refilled in the conventional manner, a new auxiliary ball plug can be installed to obturate the passage.

In FIG. 5, there is shown a headless auxiliary plug 60 that employs a plurality of annular serrations 62 to effect increased outward radial holding force for the resilient plug and its positive retention in same. The advantage of this type plug is that it, like the aforementioned ball plug, may be simply forced on into the reservoir when refilling of the pin reservoir is required and a new pin can be inserted in its place. In such an operation, service time can be minimized and the member floating about in the reservoir can effectively keep residual compounds of the lube fluid from clogging the radial supply ports. Inexpensive plastic or metal can similarly be used for these auxiliary plugs.

FIG. 6 discloses still another type of spherical reservoir plug 64 that requires a counterboard or stepped axial bore 66 for proper seating. The inner surface of this elastomeric plug will sealingly abut a circumferential shoulder 68 and a close-fitting Belleville washer retainer 70 would be forcefully inserted in the bore and against the outer surface of the ball to keep the plug in place. The outward expansion of the conically angled surface of the Belleville washer retainer maintains a one-way locking action. Conversely, snapping the retainer into an over-center condition by engaging and pulling it with a thin hooked-end probe will allow removal of the washer and plug.

Turning to FIG. 7, there is represented a modified sealed and lubricated hinge joint wherein a portion of the inner bore of the bushing rather than the pin is relieved to effect a fluid reservoir. In the event the pin plug is not readily accessible or a solid pin is required to afford maximum joint strength, a similar elastomer plug means 72 can be employed to close a radial port 74 in a reservoir bushing 76. The plug may be obturated by auxiliary plug means 78. Preferably, the port would be toward one end of the bushing to prevent the engagement of the drive sprocket from damaging the plug.

FIG. 8 illustrates a method by which a track chain using the invention would be conveniently filled with lubricating fluid as it is either wrapped or positioned on its side. Each pin bore would be quickly filled by hose from a central supply and closed with the vented plugs. All air trapped beneath the plug is automatically expelled through the vent passage by displacement as shown at 80 during insertion of the plug. Installation of the auxiliary plug would then seal the vent passage. Introducing the oil into a pin bore already closed by a vented plug would or could inherently exhaust most of the air in the upper part of the bore simply by placing the tractor on a hillside so that the plugs are in a vertically-elevated condition.

It is to be understood that the foregoing description is merely illustrative of preferred embodiments of the invention and that the scope of the invention is not to be limited thereto, but is to be determined by the scope of the appended claims.

What is claimed:

1. A method of installing resilient, vented plugs having auxiliary plug means in vent passages into pin bores having open ends of track pins on track chains comprising the steps of:
   a. Placing a track in a position wherein the open end of the pin bore is vertically upward,
   b. Filling the pin bore with lubricant,
   c. Inserting a resilient, vented plug into the pin bore,
   d. Advancing the vented plug into the pin bore to displace lubricant through the vent passage, and
   e. Inserting an auxiliary plug means into the vent passage to obturate said vent passage.

2. The invention of claim 1 further including the steps of:
   a. Inserting a tool into the vent passage,
   b. Displacing the auxiliary plug means into the pin bore with the tool so as to open the vent passage,
   c. Refilling the pin bore with lubricant through the vent passage, and
   d. Inserting a new auxiliary plug means in the vent passage so as to obturate the vent passage.

* * * * *